F. E. OILER.
CAMERA PROVIDED WITH AUTOMATIC FLUID TREATING MECHANISM.
APPLICATION FILED DEC. 6, 1910.

1,158,386.  Patented Oct. 26, 1915.
12 SHEETS—SHEET 5.

Witnesses:  Inventor.
Roy G. Skatz  Frank E. Oiler,
A. W. Handschuh  By David O. Barnell.
Attorney.

F. E. OILER.
CAMERA PROVIDED WITH AUTOMATIC FLUID TREATING MECHANISM.
APPLICATION FILED DEC. 6, 1910.

1,158,386.

Patented Oct. 26, 1915.
12 SHEETS—SHEET 7.

Frank E. Oiler, Inventor.

Witnesses:
By David O. Barnell,
Attorney.

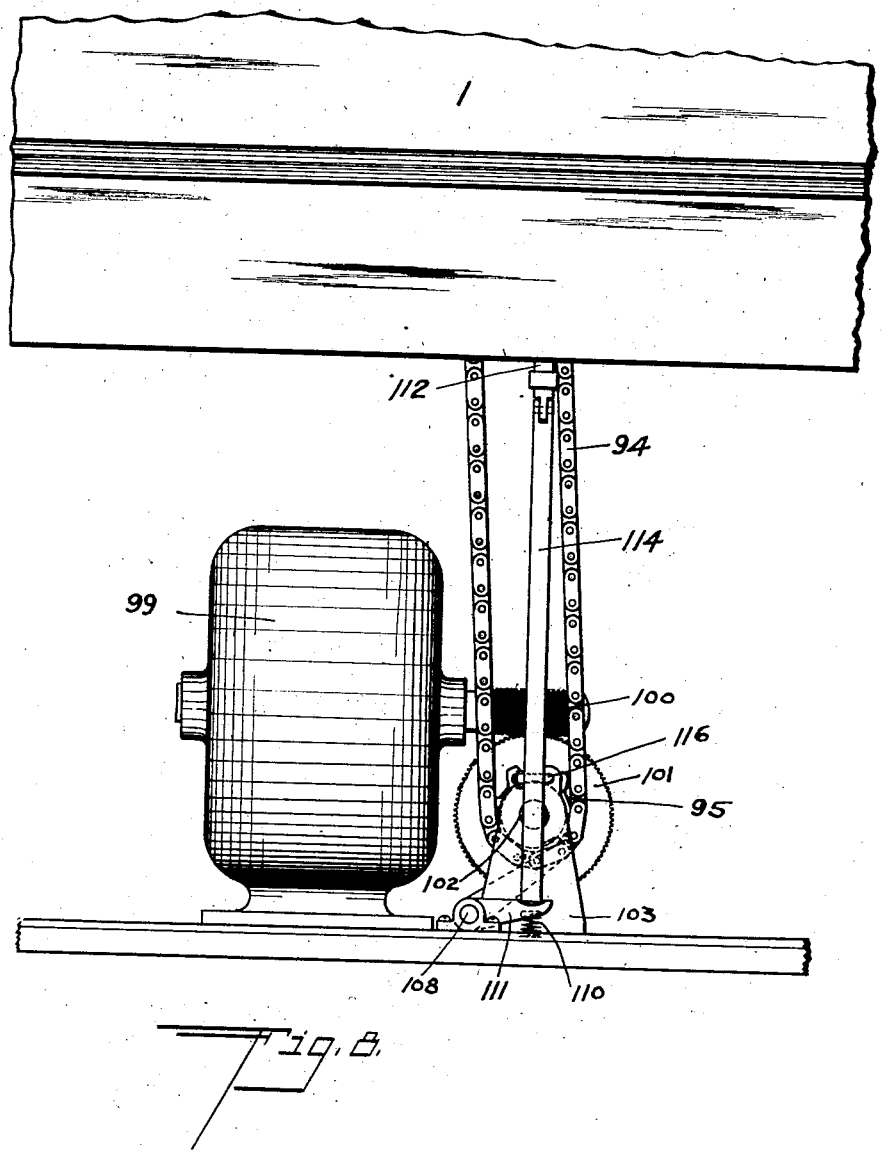

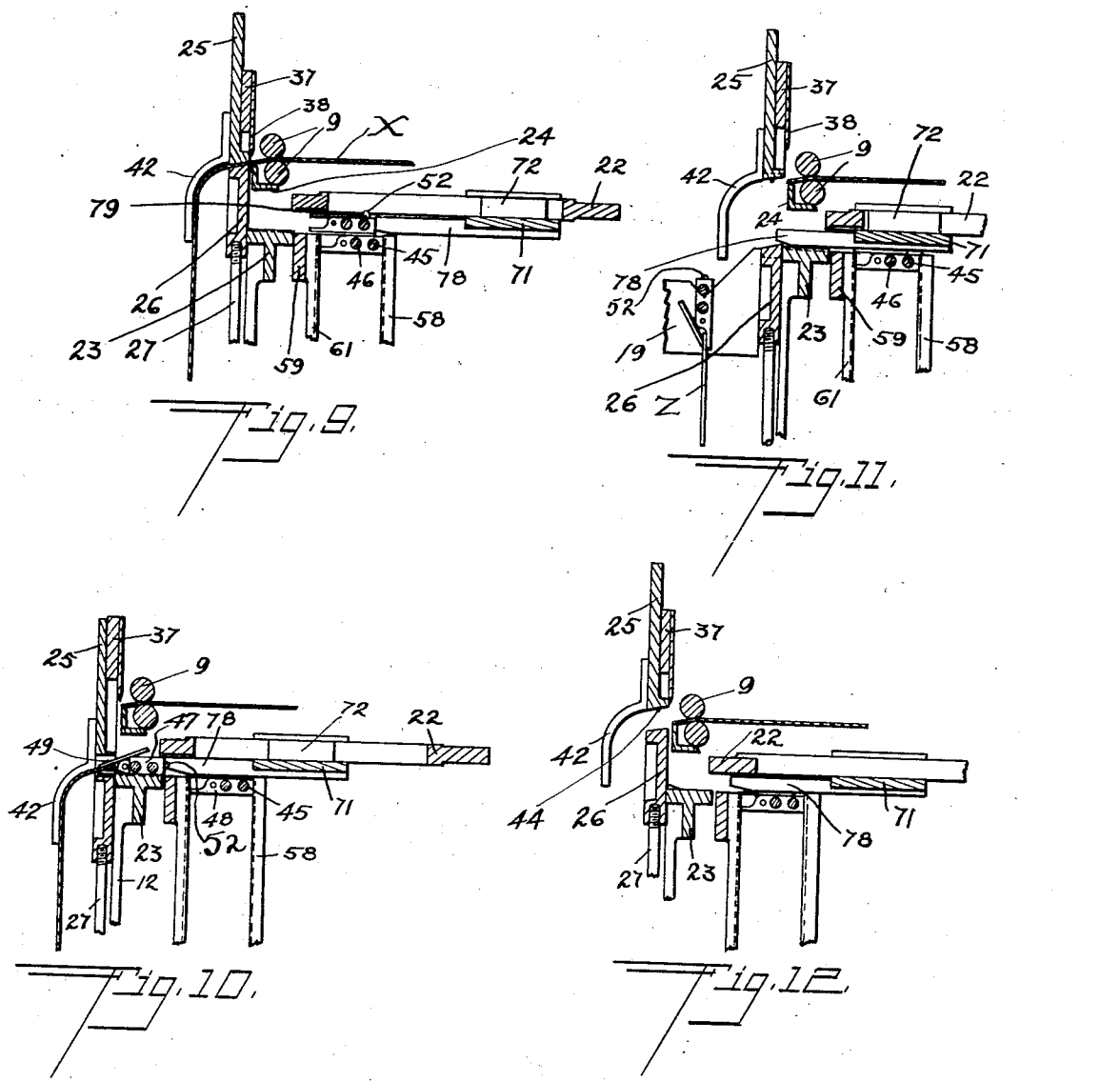

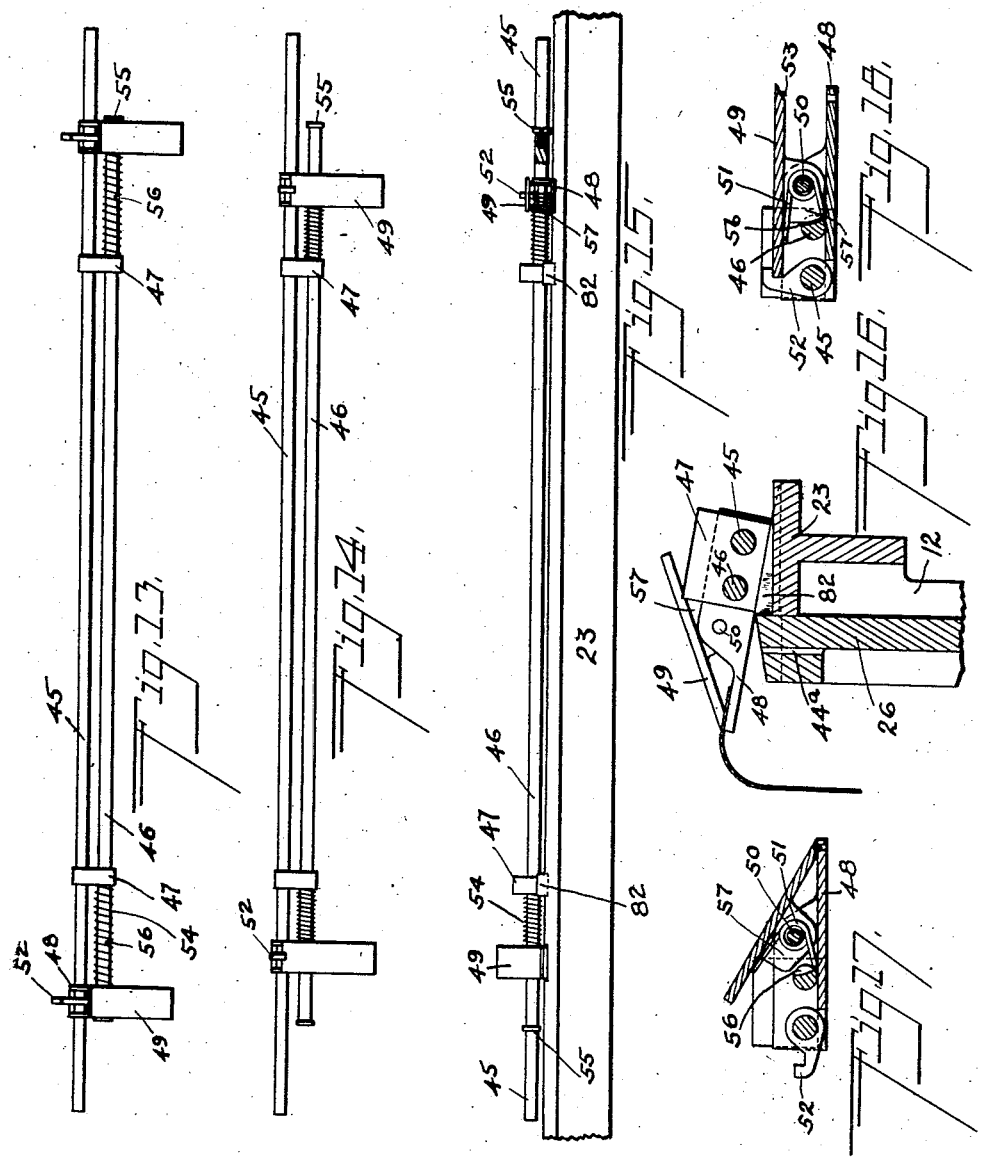

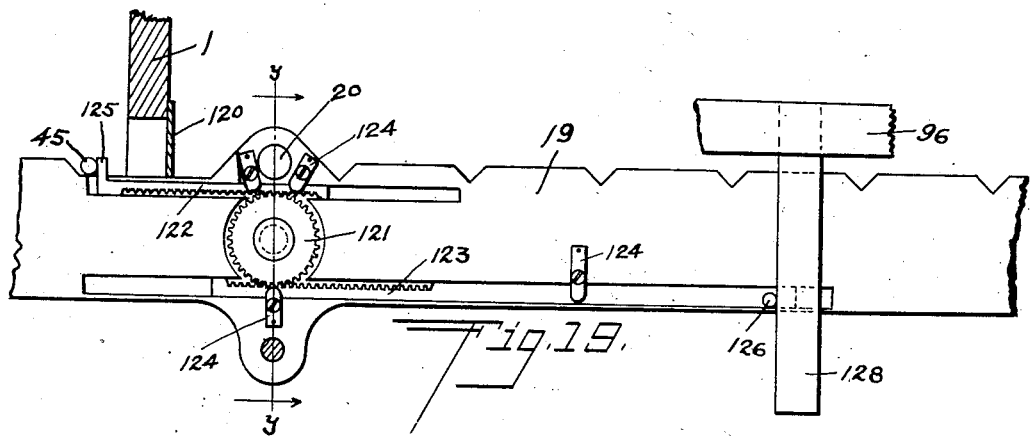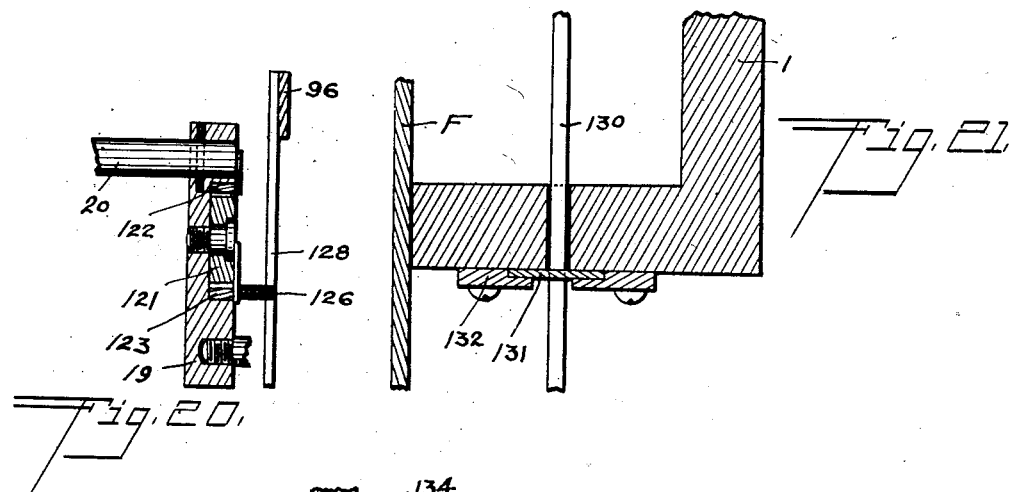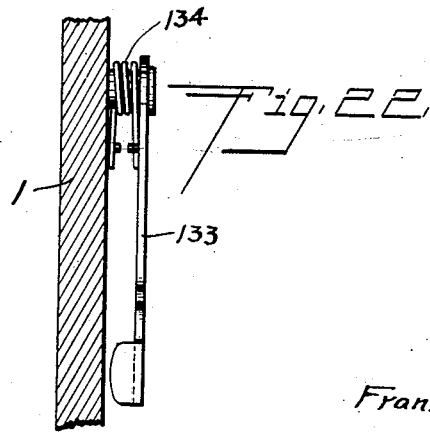

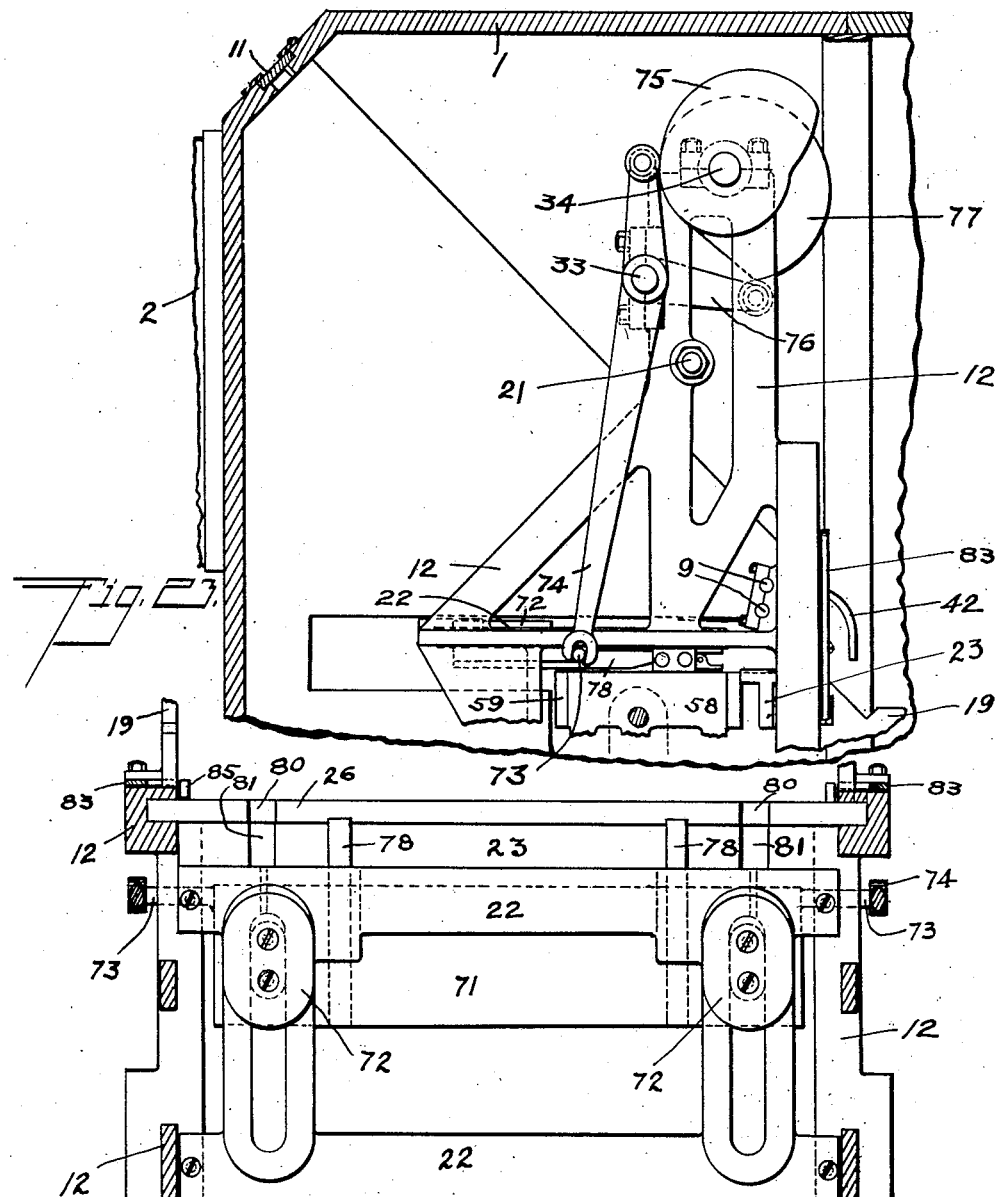

UNITED STATES PATENT OFFICE.

FRANK E. OILER, OF OMAHA, NEBRASKA, ASSIGNOR TO POSITIVE PRINT MACHINE AND PAPER CO., A CORPORATION OF NEBRASKA.

CAMERA PROVIDED WITH AUTOMATIC FLUID-TREATING MECHANISM.

1,158,386.  Specification of Letters Patent.  Patented Oct. 26, 1915.

Application filed December 6, 1910. Serial No. 595,957.

*To all whom it may concern:*

Be it known that I, FRANK E. OILER, a citizen of the United States, and a resident of Omaha, in the county of Douglas and State of Nebraska, have invented certain new and useful Improvements in Cameras Provided with Automatic Fluid-Treating Mechanism, of which the following is a specification.
My invention relates to photographic cameras provided with mechanism for developing, fixing or otherwise manipulating or treating with fluids the sensitized material.
It is the object of my invention to provide a machine of this class adapted for the direct production of prints from a continuous roll of sensitized material such as common bromid paper, and having manually controlled means for severing the exposed sections or sheets of material from the roll and starting the fluid-treating operations, and automatic means for continuing the fluid-treating operations and carrying the print outside of the light-proof casing in which the operations are commenced.

Further and more particular objects of my invention relate to the specific structure and mode of operation of certain elements of the machine, and will be more particularly pointed out hereinafter.

Figure 1:
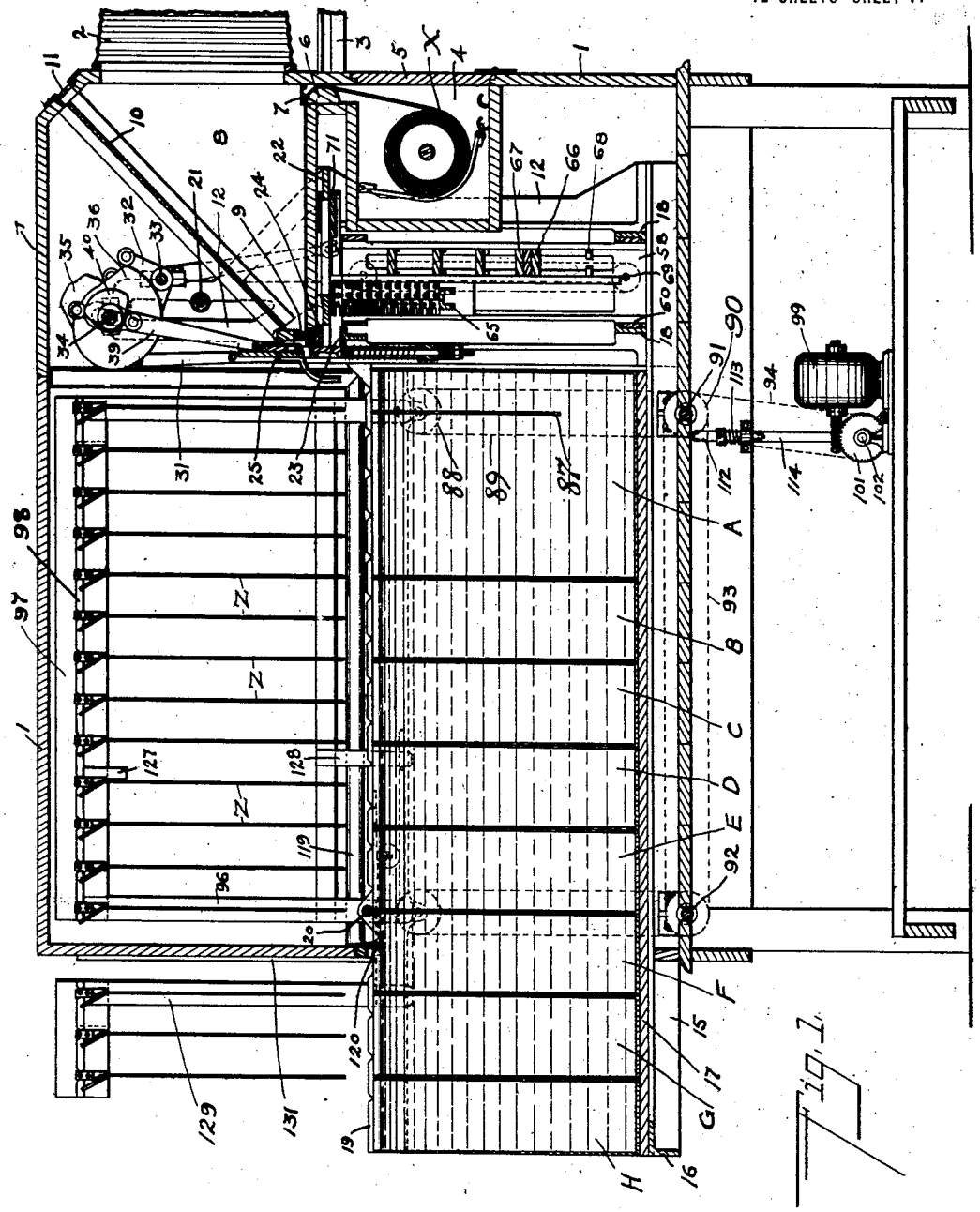
Figure 2:
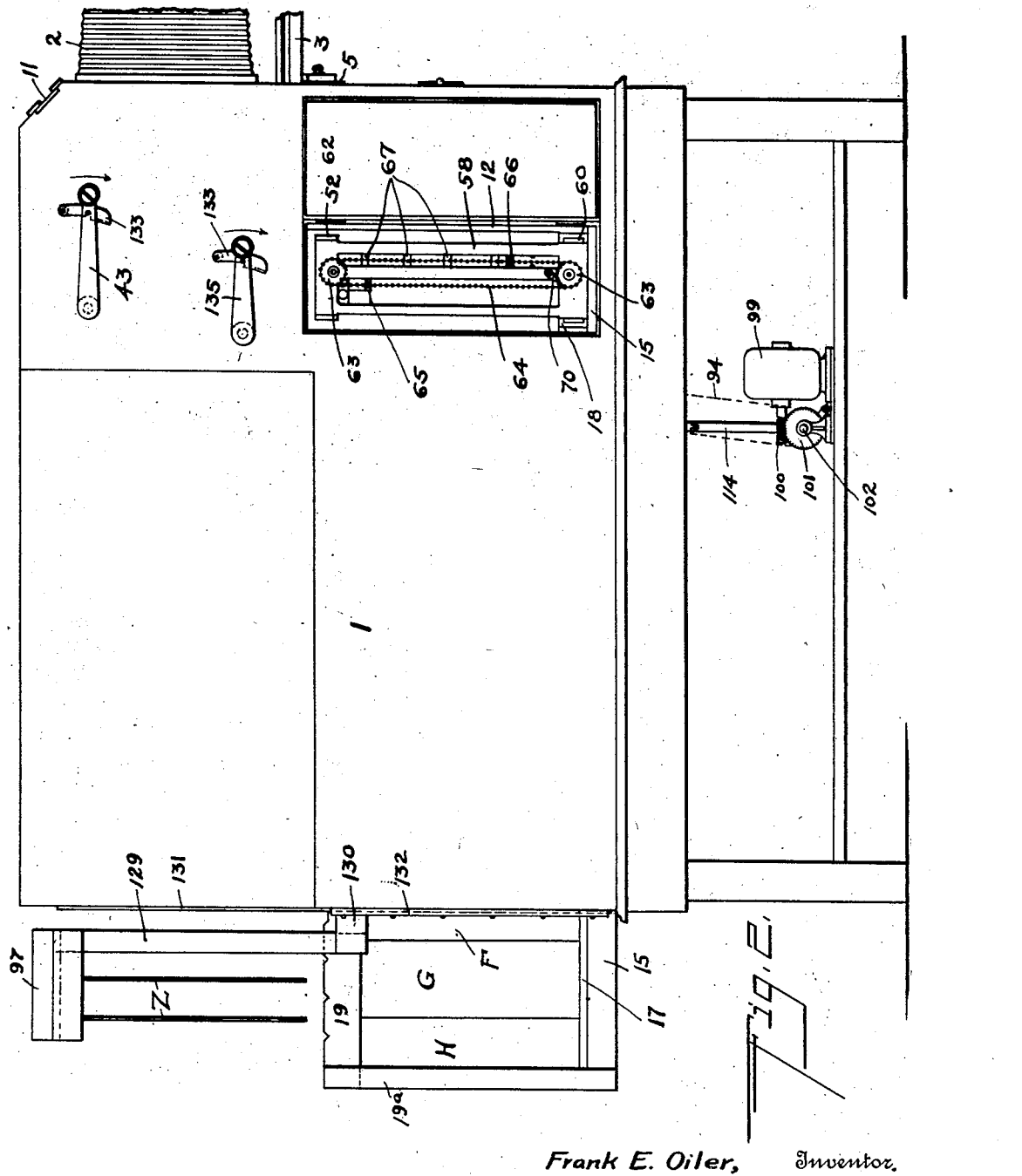
Figure 3:
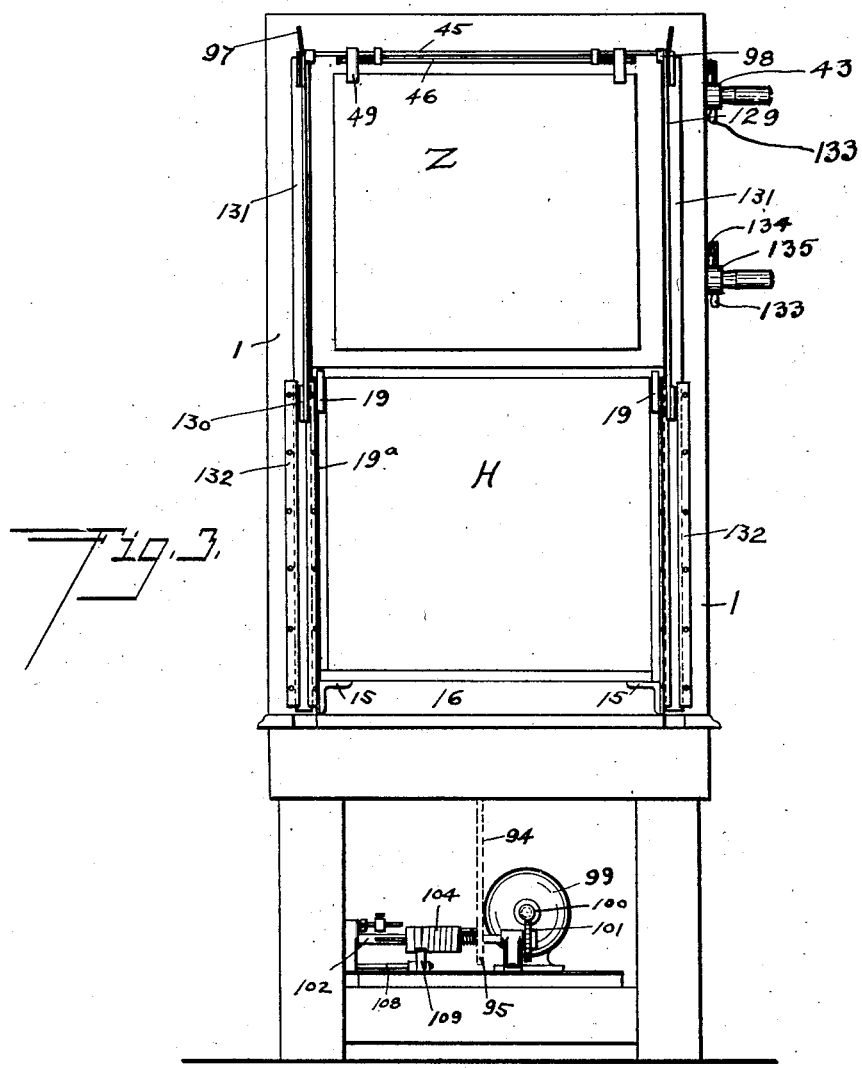
Figure 4:
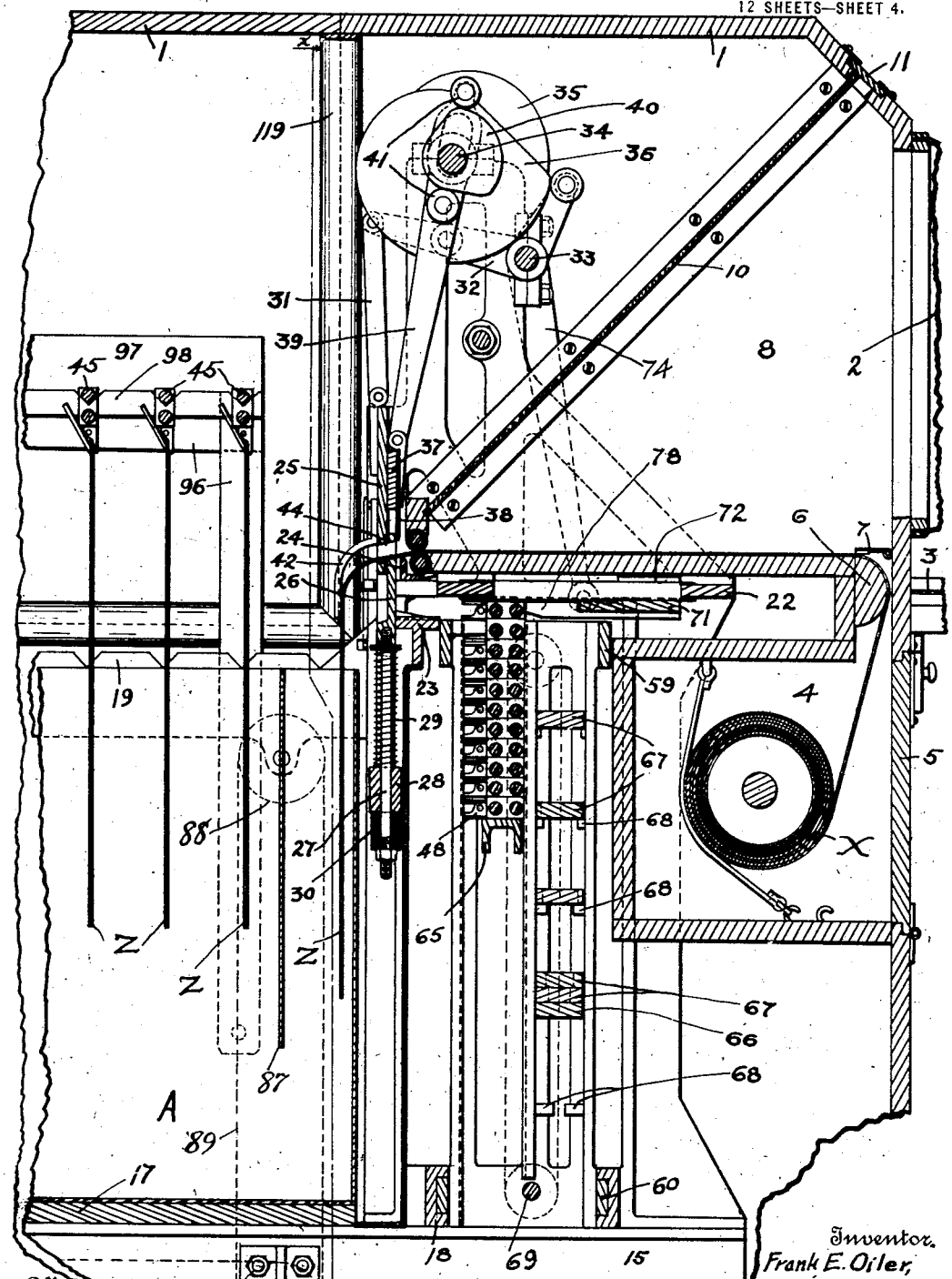
Figure 5:
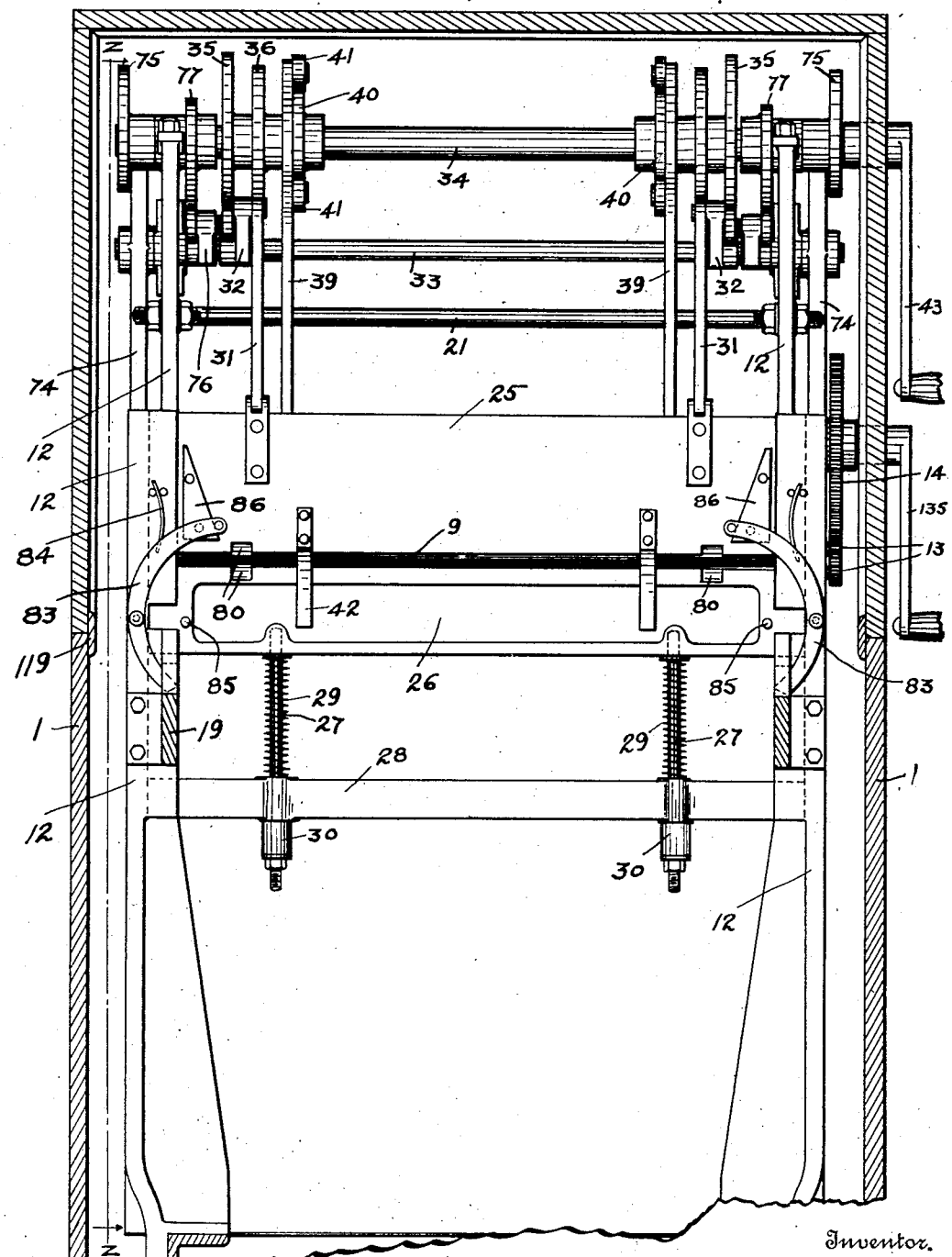
Figure 6:
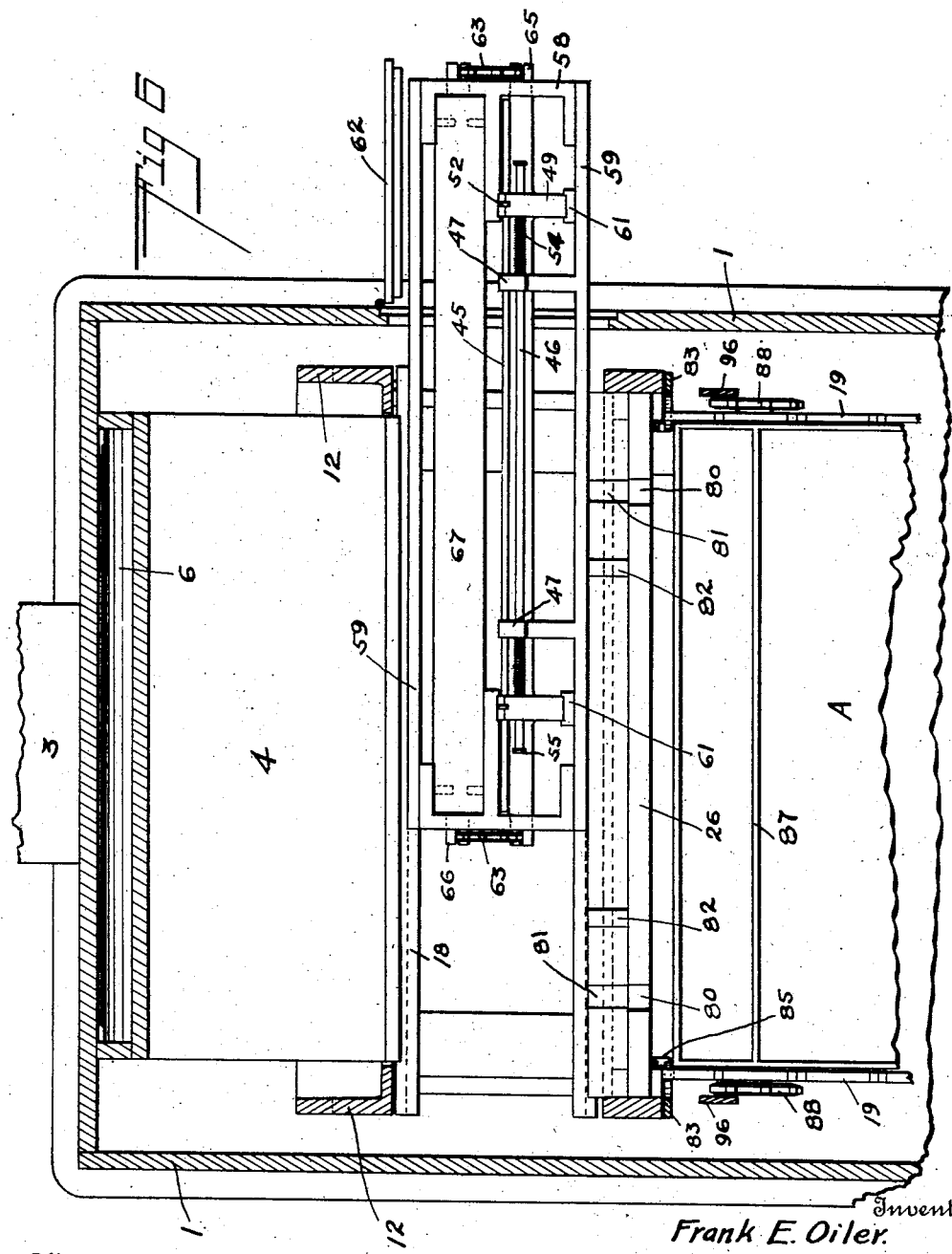
Figure 7:
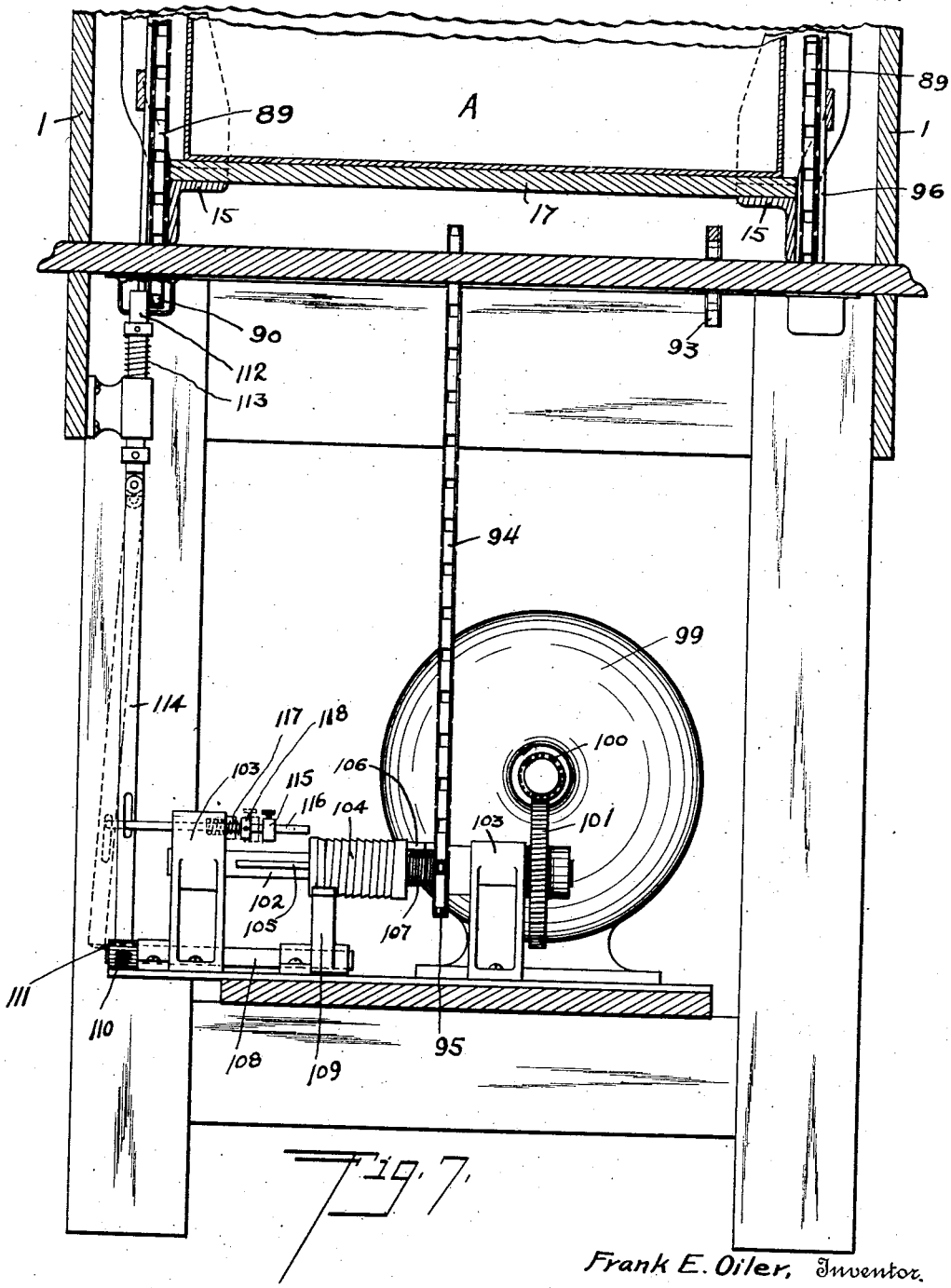

Constructions embodying my invention are illustrated in the accompanying drawings, in which—
Figure 1 is a longitudinal vertical section of the machine, Fig. 2 is a side elevation thereof, Fig. 3 is a rear end elevation, Fig. 4 is a detail, drawn to an enlarged scale, of some of the mechanism shown in Fig. 1, Fig. 5 is a detail transverse section on the plane indicated by the line $x$—$x$ of Fig. 4, Fig. 6 is a detail horizontal sectional view taken above the carrier magazine, Fig. 7 is a detail transverse section showing the motor and disconnecting device, Fig. 8 is a detail side elevation of the same, Figs. 9, 10, 11 and 12 are details showing the various steps or phases of the operation of severing the sheets and causing them to be engaged by the carriers, Fig. 13 is a plan view of one of the carriers with the clips in released or spread position, Fig. 14 is a similar view with the clips in the positions assumed while they are in the magazine, Fig. 15 is a rear elevation of a carrier and the bridge-bar, Fig. 16 is a transverse section of a carrier and the bridge-bar, Fig. 17 is a transverse section through one of the carrier clips in closed position, Fig. 18 is a similar view showing the clip open, Fig. 19 is a detail side elevation of the device for moving the carriers through the end of the casing, Fig. 20 is a detail transverse section taken on the plane of the line $y$—$y$ of Fig. 19, Fig. 21 is a detail horizontal section through the light-excluding slide of the carrier-actuating or conveyer frame, Fig. 22 is a detail of one of the crank stop-latches, Fig. 23 is a detail vertical section on the plane of the line $z$—$z$ of Fig. 5, showing in elevation a portion of the operating mechanism, and Fig. 24 is a detail horizontal section above the cross-plate which supports the carrier feed-slide.

In carrying out my invention I provide a suitable casing 1, to which at the upper part of the front end thereof is attached a camera bellows 2 connecting with a suitable lens, not shown in the drawings. A bed-plate 3 is extended out from the front of the casing to support the lens in the usual way. In the lower part of the casing at the front thereof is formed a storage chamber 4 in which is disposed a roll X of the sensitized material used with the machine. Access to the storage chamber is afforded by means of the door 5 in the front of the casing.

The strip of material from the roll X is passed up through an opening at the top of the chamber 4, around the semi-cylindrical guide-bar 6, below the flap 7 and along the bottom of the exposure chamber 8 to the feed rolls 9. The upper part of the exposure chamber is formed by a mirror 10 which receives the light rays projected through the bellows 2 by the lens, and reflects the same down onto the strip of sensitized material, at the same time rectifying the image of the object photographed so that the same will not appear reversed as it would if the image were received directly from the lens. The upper edge of the mirror adjoins an opening in the casing through which the mirror may be withdrawn therefrom, and said opening is normally closed by a slide 11 which may be opened slightly to permit the bottom of the exposure chamber to be viewed in focusing.

The feed rolls 9 are journaled at their ends in the side-frames 12, and at one end are provided with pinions 13 which mesh with each other, and one of which meshes with a gear 14 arranged as shown in Fig. 5. The said gear is connected with a crank 135 at the side of the casing, and is preferably so proportioned relative to the pinions 13 that one complete turn of the crank will turn the feed rolls a sufficient number of revolutions to feed through the same a length of the strip of sensitized material equal to the length of the exposure chamber.

The machine frame which carries the operating mechanism is preferably constructed separately from the casing 1, so that the machine elements may be assembled thereon before the frame is placed in the casing. Of the said machine frame the base portion is formed by the longitudinally extending angle-bars 15 which are connected to each other at their rearward ends by the cross-bar 16, and on which is arranged the deck 17 which supports the fluid tanks. The side frames 12 are connected to the bars 15 near the front ends thereof, and said side frames are connected with each other at their lower portions by the cross-bars 18. The side-bars 19 extend rearwardly from the frames 12 adjoining the upper edges of the fluid tanks, and said side-bars are connected with each other near their rearward ends by a cross-rod 20, their rearward ends being supported by the bars 19ᵃ which extend down to the bars 15. The upper portions of the side-frames 12 are connected with each other by means of a cross-rod 21, and the intermediate portions of the side-frames are connected by the cross-plate 22, the bridge-bar 23, ledger-bar 24 and cross-bar 28.

In the side-frames 12 adjacent to the feed-rolls are formed vertical guideways in which the ends of the upper and lower clamp-bars 25 and 26 are slidably held. The lower clamp-bar 26 has rods 27 extending down through the cross-bar 28, and around said rods are disposed the coil springs 29 which normally hold the bar 26 in the raised position shown in Figs. 1, 4, 5, 9 and 12. Below the cross-bar 28 the rods are provided with nuts which normally bear against the resilient buffers 30, as shown, and limit the upward movement of the clamp-bar. The upper clamp-bar 25 is connected by means of the rods 31 with the ends of the cam-levers 32 which are fulcrumed on the shaft 33. Each of said cam-levers 32 has two arms, one of which extends upwardly in front of the cam-shaft 34, and the other extends rearwardly below said shaft. The rearwardly extending arms carry rollers which engage cams 35 carried by the shaft 34, and by which the clamp-bar is moved downwardly. The upwardly extending arms carry rollers which engage the cams 36 carried on the shaft 34, and by which the clamp-bar is moved upwardly.

The knife-bar 37 is disposed in front of the upper clamp-bar, of which the front and upper portion is recessed, as shown, to provide a space for the knife-bar. The cutter-blade 38 is secured to the front face of the bar 37 and projects sufficiently below the same to enable it to extend down past the foot of the upper clamp-bar. To the knife-bar are connected the cam-rods 39 which at their upper ends are slotted and pass around the cam-shaft 34 adjoining the cams 40. Rollers 41 are carried on the sides of the rods 39 and engage the cams 40 by which the knife-bar is both raised and lowered.

The normal position of the knife-bar and clamp-bars is shown in Figs. 1 and 4, the adjacent edges of the clamp-bars being separated so as to leave an opening between them behind the feed rolls 9. After a section of the sensitized material has been exposed in the chamber 8, the crank 135 is turned to feed the strip of material out between the clamp-bars and over the top edge of the ledger-bar 24. The front edge of the strip of material engages the guide fingers 42, which are carried on the rearward side of the upper clamp-bar and which direct the strip downward. After the strip of material has been fed out between the clamp-bars, the cam-shaft 34 is turned by means of the crank 43 which is carried on the end thereof at the side of the casing, as shown. At the beginning of the movement of the cam-shaft the upper clamp-bar is moved downward into engagement with the strip of material so as to press the same against the lower clamp-bar as shown in Fig. 9. To assist in holding the sheet of material the upper clamp-bar is provided at its lower edge with several pointed studs 44 which perforate the strip and pass into corresponding openings 44ᵃ in the lower clamp-bar. After the strip of material has been clamped between the bars the knife-bar is moved downwardly so that the cutter-blade passes into the narrow opening between the lower clamp-bar and the ledger-bar 24 and severs the clamped sheet from the strip of the material held by the feed rolls. The upper clamp-bar is then moved on downward, pushing the lower bar before it, until the rearward edge of the severed sheet Z is near the upper edge of the bridge-bar 23, at which position the carriers are engaged with the sheets, as shown in Fig. 10.

Each of the carriers comprises a frame formed by the rods 45 and 46 which pass through and are secured in the blocks 47, and two clips mounted on the said frame near the ends thereof. The clips each consist of a lower jaw member 48 which is slidably mounted on the frame-rods, an upper jaw 49 pivotally mounted by means of a pin 50 with the lower jaw member, a spring 51 arranged to turn the nose portion of the upper jaw down into engagement with the lower jaw, and a hook 52 pivotally mounted on the rod 45 between the side portions of the lower jaw member. Springs 54, arranged on the rod 46 between the clips and the blocks 47, tend to keep the clips pushed out toward the ends of the carrier and in engagement with the stops formed by the heads of the screws 55 in the ends of the rod 46. In the rod 46 between the blocks 47 and the ends of the rod are formed notches 56, and the rearward sides of the pivot-lugs 57 of the upper jaws are extended so as to enter the said notches when the jaws are open, as shown in Fig. 18. The hooks 52 are employed as shown in said figure to hold the jaws of the clips open, and when the jaws are open the clips are held in the relative positions shown in Fig. 14 by the engagement of the lugs 57 in the notches 56. The clips are secured in the positions shown in Figs. 14 and 18 preparatory to placing the carriers in the magazine. When the hooks 52 are released from engagement with the jaws 49, the springs 51 close the jaws and the lugs 57 are thus withdrawn from the notches 56 so that the springs 54 are permitted to push the clips out to the ends of the rod 46, as shown in Fig. 13.

The magazine for the carriers has a cage or open frame consisting of the end members 58, the upper and lower transverse connecting members 59 and 60, and the vertical guide members 61. The lower connecting members 60 fit into channels and are thus slidably held in the frame cross-bars 18. At the side of the casing 1 is a door 62 which may be opened and the magazine drawn out through the same, as shown in Figs. 2 and 6, for convenience in placing the carriers therein. At each end of the magazine and near the upper and lower ends of the members 58 are small sprockets 63 around which are passed the endless chains 64. To the vertically extending portions of said chains at the rearward side of the magazine are connected the ends of the carrier follower-bar 65, the ends of which extend through vertical slots in the members 58, as shown. At the front side of the magazine the ends of the counterweight follower-bar 66 are connected with the chains 64. The follower-bars are so arranged upon the chains that when the magazine is filled with the carriers and the bar 65 is near the bottom of the magazine, the counterweight follower 66 will be near the top of the magazine and will support all of the counterweights 67.

The weights 67 are so proportioned that they will more than balance the weight of the carriers and will thus tend to eject them from the top of the magazine. As the carriers are removed from the magazine and the counterweight follower descends, the weights 67 are successively engaged and supported by the pins 68 which are arranged as shown in Fig. 4, being of graduated length and the shorter ones thereof passing through slots made in the sides of the weights. The counterweight load is thus kept in approximate proportion to the weight of the carriers in the magazine, and excessive upward pressure thereon avoided. The lower sprockets 63 around which the chains 64 are passed are connected with each other by a shaft 69 which is journaled in the end members 58. Near the sprocket on the end of the magazine adjoining the door 62 in the casing is a pawl 70 which may be engaged with the sprocket to prevent rotation thereof and thus to retain the carrier follower at any desired height in the magazine. When the magazine is to be filled with the carriers the door 62 is opened, the sprocket turned sufficiently to lower any of the carriers contained in the magazine out of engagement with the cross-plate 22, the magazine drawn out of the side of the casing through the door 62, and the carriers then placed in the magazine so that the blocks 47 thereof form a continuous column therein, the follower being pushed gradually down toward the bottom of the magazine and being retained at its successive positions by the engagement of the pawl 70 with the sprocket. After the magazine has been filled with the carriers it is pushed back into position within the casing, the pawl 70 disengaged from the sprocket so that the counterweights are permitted to pull the column of carriers up against the lower side of the cross-plate 22, and the door 62 closed.

On the lower side of the cross-plate 22 is arranged the carrier feed-slide 71 which is connected with the cross-plate by means of the guide-blocks 72 which extend up through slots in the plate and have flanges extending over the upper side thereof. The end portions of the feed-slide carry round studs 73 which extend out through the side-frames 12 and are engaged by the forked ends of the cam-levers 74 which are secured upon the ends of the shaft 33. The upper arms of said cam-levers 74 carry rollers which engage the cams 75 by which the levers are actuated to move the feed-slide rearwardly, and upon the shaft 33 inside of the frames are secured cranks 76 which carry rollers engaging the cams 77 by which the feed-slide is moved forwardly. The feed-slide carries fingers 78 which are alined transversely with the blocks 47 of the carriers in the magazine. During the rearward movement of the feed-slide the ends of said fingers 78 engage the blocks 47 of the uppermost carrier and push the same from the magazine rearwardly over the bridge-bar
23. As the clips on the carriers pass from under the plate 22 the hooks 52 are engaged by the clips 79 at the edge of said plate and are turned back so that the jaws of the clips are permitted to close. Before the jaws are released, however, the rearward ends or nose portions thereof enter the notches 80 in the clamp-bars and pass above and below the edge of the sheet of material held thereby, so that as the jaws close they engage and grip the sheet, as shown in Fig. 10. In the upper side of the bridge-bar are channels 81 through which the lower portions of the clips pass in moving across the bar. By the engagement of the clips in said channels the same are temporarily prevented from being moved out toward the ends of the carrier by the springs 54 after the lugs 57 are released from the notches 56 by the closing of the jaws, as hereinbefore described. Thus the sheet of sensitized material is engaged by the clips while the same are held at the positions nearest to each other, and after the carrier has passed the bridge-bar the clips are released so that the edge of the sheet of material is held under tension and the same caused to hang from the carrier in a vertical plane. By the movement of the clips away from each other any expansion of the sheet due to its immersion in the treating-fluids is also compensated.

After the carrier is engaged with the sheet of material held by the clamp-bars, the upper clamp-bar is moved upwardly to a position such as shown in Fig. 11, after which the carrier feed-slide is moved rearwardly to the position shown in said figure and the carrier thus pushed through the space between the clamp-bars so that the end portions of the rod 45 engage the inclined end portions of the side-bars 19 and slide down the same to the first of the notches in the upper edges of the side-bars. In order to prevent the carrier from catching on the lower clamp-bar in passing over the same, the bridge-bar 23 is provided on its upper surface with inclined portions 82 which are engaged by the blocks 47 and the carrier thus raised over the lower clamp-bar. During the upward movement of the upper clamp-bar the lower clamp-bar is retained at its lower position shown in Figs. 10 and 11, by means of the curved levers 83 which are fulcrumed on the side-frames 12 as shown in Fig. 5, and of which the lower ends are normally turned inwardly by means of the springs 84. The said lower ends of the levers engage the pins 85 on the lower clamp-bar when said bar is pushed to its lower position, and thus retain the same in said position until they are released. The upper ends of the levers are provided with pins adapted to be engaged by the inclined faces of the blocks 86 which are disposed on the rearward side of the upper clamp-bar near its ends. As the upper clamp-bar approaches its uppermost position the said inclined faces of the blocks 86 turn the levers so that the lower ends thereof are disengaged from the pins 85 and the lower clamp-bar is thus released so that the springs 29 are permitted to move it up to its initial position, as shown in Fig. 12. Before the clamp-bar is released the forward movement of the feed-slide is commenced so that the fingers 78 are out of the way of the bar when its upward movement is commenced. At the conclusion of the forward movement of the feed-slide the carriers in the magazine are permitted to move up until the uppermost carrier engages the cross-plate 22 and said carrier is in position to be engaged and pushed out of the magazine by the next rearward movement of the feed-slide.

As the sheet of sensitized material is fed out by the feed rolls and the rearward edge thereof directed downward by the guide fingers 42, the said edge of the sheet enters the front portion of the first fluid-tank A. In said tank A near the front side thereof is disposed a partition-plate 87 which extends from the top of the tank to a point near the bottom thereof, and which serves to prevent the sheet of material, while it is relatively stiff and before it is moistened by the fluid in the tank, from being pushed back in the tank far enough to engage that sheet of material which hangs in the tank at the next succeeding position.

At the positions indicated on the side-bars 19 sprockets 88 are revolubly mounted, and endless chains 89 pass over said sprockets and extend down and around the sprockets 90 which are carried on the ends of the shafts 91 and 92. Said shafts are journaled in suitable bearings arranged on the angle-bars 15, and on their central portions carry sprockets which are connected with each other by a chain 93 so that when the shaft 91 is driven the shaft 92 is actuated at the same speed. The shaft 91 carries a sprocket which is connected by the chain 94 with the driving sprocket 95. The conveyer frames 96 are connected with the chains 89 at similar positions thereon so that when said chains are driven all parts of the conveyer frames move in paths the same as those of the chains. At the upper edges of the conveyer frames are the guide-plates 97 which are so arranged as to extend up past the ends of the rods 45 of the carriers and prevent transverse displacement of the carriers. Along the lower and inner edges of the guide plates 97 are bars 98 of which the upper edges have V-shaped notches made therein at equal intervals the same as those between the notches in the upper edges of the side-bars 19. The diameters of the sprockets 88 and 90 are such that the longitudinal movements of the conveyer frames are the same as the distances between the said notches in the bars 98 and the side-bars 19. The vertical movements of the conveyer frames are such that during the forward longitudinal movement the bars 98 will swing below the notches in the side-bars 19 and thus deposit the ends of the rods 45 of the carriers in said notches, and at the beginning of each upward movement each carrier will be engaged and lifted by the conveyer frames, and at the downward movement thereof deposited in the next rearward set of notches in the side-bars. As the carriers are thus intermittently moved rearwardly the sheets Z of the sensitized material carried thereby are successively immersed in the fluids contained in the tanks A, B, C, D, E and F. The relative duration of treatment by any of the liquids contained in the tanks is determined by the number of times each sheet is dipped in the fluid. The actual time of each immersion of the sheets is determined by the driving mechanism of the conveyer frames, and said driving mechanism may be adjusted to vary the period of immersion, as follows: The shaft of the driving motor 99 carries a worm 100 which meshes with a worm-wheel 101 carried on a shaft 102. The said shaft is journaled in bearings 103 and the driving-sprocket 95 is revolubly mounted on the shaft. Adjacent to the driving-sprocket the clutch-sleeve 104 is mounted on the shaft and slidably connected therewith by a spline 105. On the end of the sleeve adjoining the sprocket is a pin 106 adapted to engage a similar pin on the side of the sprocket and thus drive the same. A spring 107 is arranged on the shaft between the sprocket and sleeve and tends to push the sleeve away from the sprocket and thus disengage the same therefrom. The outside of the sleeve is threaded, as shown, the thread being preferably of the "buttress" type and having the radial faces of the thread opposite the end of the sleeve adjoining the sprocket. A rocking-shaft 108 carries at one end an arm 109 which is adapted to engage the threaded surface of the clutch-sleeve, being normally pressed toward the sleeve by means of a spring 110 placed under an arm 111 carried at the outer end of the rocking-shaft. By the engagement between the arm 109 and the threaded surface of the sleeve, when the driving-shaft 102 is driven the sleeve is moved along the shaft toward the sprocket until the sleeve is past the arm. Such movement of the sleeve compresses the spring 107 and engages the pin 106 with the sprocket so that the same is driven thereby and continues to be so driven as long as the shaft 102 continues to rotate and the arm 109 is in position to engage the sleeve. As the conveyer frames reach the lower limit of their movement one of said frames engages the upper end of a rod 112 which is held in a suitable guide as shown in Fig. 7 and which is normally held up by a spring 113. To the lower end of the rod 112 is articulated the push-rod 114 of which the lower end engages the arm 111 so that when the rod is pushed downwardly by the movement of the conveyer-frame the rocking-shaft 108 is turned and the arm 109 disengaged from the clutch-sleeve. When the arm is disengaged from the sleeve the spring 107 moves the sleeve longitudinally away from the sprocket 95 and thus disengages the same therefrom so that the sprocket is no longer driven thereby. As the clutch-sleeve moves toward the outer one of the bearings 103 the end thereof engages the collar 115 which is adjustably secured on the trip-rod 116. The said trip-rod is slidably held in the bearing 103, the outer end thereof is connected with the push-rod 114, and it is normally pushed inwardly by a spring 117 which extends into a recess in the bearing and which engages a stop-collar 118 secured on the rod. When the collar 115 is engaged by the clutch-sleeve and pushed outwardly the push-rod is moved laterally as shown by the dotted lines in Fig. 7 so that the end thereof is disengaged from the arm 111 and the rocking-shaft thus permitted to turn and reëngage the arm 109 with the clutch-sleeve. When such engagement is made the sleeve begins its return movement toward the driving-sprocket and, after a predetermined number of turns of the driving-shaft, again engages and begins to actuate the sprocket 95. Thus after each downward movement of the conveyer frames to deposit the sheets of material in the fluid tanks, the movement of the frames is discontinued for a time and the sheets allowed to remain immersed in fluids. The duration of the immersion may be regulated by varying the position of the collar 115 on the trip-rod 116, thus varying the distance which the clutch-sleeve moves away from the driving-sprocket, and consequently the number of turns of the driving-shaft which is required to return the clutch-sleeve to engagement with the sprocket. It is, of course, assumed that the motor runs continuously and at a uniform speed.

The upper and rearward portion of the casing 1, covering the space into which the carriers are lifted by the conveyer frames, is made removable in order to provide access to the fluid tanks and operating mechanism. The joint around the edge of the removable portion is rendered light-proof by any suitable means, such as the lap-strip 119 shown. All of the fluid-treating operations required to be conducted in darkness are made within the tanks A, B, C, D, and E, so that when the prints are immersed in the fluid contained in the tank F they are ready to be exposed to light. The tank F is so arranged that half of the same extends outside of the casing, and to the lower edge of the casing above the tank is attached a flap 120 of flexible opaque material, which normally dips into the fluid in the tank. When the machine is exposed to bright light coming from a source such that the rays may enter the exposed surface of the fluid in the tank F, it may be necessary to employ an opaque or colored fluid in said tank in order to prevent the light entering the casing by refraction and reflection in the fluid. Adjacent to the tank F each of the side-bars 19 has a long notch formed in the upper edge thereof, as shown, the extent of the notch being such that one end is inside and the other outside of the casing. After a carrier is lifted by the conveyer frames out of the rearward part of the tank E, at the next downward movement it is deposited so that the print carried thereby hangs in the front part of the tank F and the ends of the rod 45 of the carrier rest in the front part of said long notches in the side-bars. During the forward movement of the conveyer frames, and while all of the prints are immersed in the tanks, the carrier holding the print in the tank F is moved from the inside to the outside of the casing by the following means: In each of the side-bars 19 adjoining the ends of the tank F are recesses in which are rotatably mounted the pinions 121. Rack-bars 122 and 123 are slidably disposed in grooves made in the side-bars and intersecting the pinion recesses, the teeth of the rack-bars meshing, respectively, with the upper and lower portions of the pinions. The rack-bars are retained in the grooves by means of the plates 124 arranged and secured to the side-bars as shown in Fig. 19. At the rearward ends of the bars 122 are formed the lips 125 which extend up in front of the rod 45 of the carrier. On the front ends of the bars 123 are laterally projecting pins 126 adapted to be engaged by the fingers 127 and 128 carried by the conveyer frames. The forward movement of the conveyer-frames, being communicated to the rack-bars 123 by the fingers 127, rotates the pinions and moves the rack-bars 122 rearwardly. During said movement the rod 45 of the carrier is engaged by the lips 125 and the carrier thereby pushed outside the casing, passing under the flap 120 which returns to its normal position when the carrier is past the same. After the upward movement of the conveyer frames and during the rearward movement thereof the rack-bars are returned to their normal positions by the engagement of the fingers 128 with the pins 126 on the lower rack-bars, as indicated in Fig. 19. After a carrier is pushed outside of the casing it is in position to be engaged and lifted from the tank by the outer conveyer frames 129 at the next upward movement thereof. The outer conveyer frames are connected with the main or inner frames 96 by the bars 130 which pass through vertically extending slots in the casing, from which the light is excluded by the means shown in detail in Fig. 21. The bars 130 pass slidably through openings in the vertical slide-bars 131, and the latter bars are held in guideways 132 secured upon the casing adjoining the vertical slots in the casing. The vertical movements of the conveyer frames are permitted by sliding of the bars 131 in the guideways, and the longitudinal movements of the frames are permitted by the movement of the bars 130 through the vertical slide-bars. Outside of the casing are provided one or more tanks, G and H, into which the prints are conveyed from the tank F, and from which they may be removed by hand.

On the side of the casing adjacent to the cranks 43 and 135 are pivotally mounted the stop-latches 133. Said stop-latches have hook-like notches therein adapted to engage pins arranged on the cranks as indicated by the dotted lines in Fig. 2. Springs 134 arranged as indicated in Fig. 22, normally turn the latches toward the cranks. When one of the cranks is to be turned, the handle thereof is grasped and the stop-latch turned with the thumb until the latch is disengaged from the crank. The crank is then turned one complete revolution, at the conclusion of which it again engages the latch and is stopped thereby.

From the foregoing the operation of the machine will be apparent. It will be noted that the only manual operations required in the production of prints by the machine are the making of the proper exposure by opening and closing the lens-shutter of the camera, the turning of the cranks 43 and 135, and the removal of the prints from the tank H. The treating of the sheets of sensitized material with the fluids, being automatically performed, may be regulated with exactness and the machine thus employed with processes requiring great nicety in the manipulation of the material. As a relatively large number of prints are under treatment at the same time, the machine has a large capacity even with processes requiring considerable time in the treatment of each print. As the fluids which are used do not come into contact with any of the mechanism, and touch nothing but the tanks and the prints, corrosive substances may be used in the treating of the prints without necessitating any part of the machine other than the tanks to be made of materials capable of resisting the corrosive action of the fluids.

This enables the use of the machine in processes which could not be employed with machines using flexible belts and the like to carry the prints through the fluids, since the belts would be destroyed by the corrosive fluids used in such processes.

Now, having described my invention, what I claim and desire to secure by Letters Patent is:

1. In a machine of the class described, the combination with means for exposing portions of a strip of sensitized material, of clamping devices, means for feeding the strip of material from the exposing means between the clamping devices, means for moving the clamping devices to clamp the strip, means for severing the clamped portion from the strip, a carrier having clips adapted to grip the edge of a sheet, means for engaging the carrier clips with the edge of the sheet held by the clamping devices, a series of fluid receptacles, and means for conveying the carrier so as to immerse the sheet successively in said receptacles while the sheet is held by the carrier.

2. In a machine of the class described, means for manipulating a sheet of sensitized material, including a carrier having clips adapted to grip the edge of the sheet, means for engaging the carrier clips with the sheet, a series of fluid receptacles, and conveying devices moving adjacent to the said receptacles, the conveying devices being adapted to successively lift, transport, and deposit the carrier in a series of positions such that the sheet held thereby will be successively dipped into the receptacles at corresponding positions.

3. In a machine of the class described, means for manipulating a sheet of sensitized material, including a carrier having clips adapted to grip the edge of the sheet, means for engaging the carrier clips with the sheet, a series of fluid receptacles, and conveying devices moving adjacent to the receptacles in endless paths having vertical and horizontal components, the conveying devices being adapted to raise and lower the carrier during the vertical movements thereof, to transport the carrier during the horizontal movements thereof in one direction, and to disengage from the carrier during the horizontal movement in the other direction, whereby the carrier will be moved so that the sheet held thereby will be successively dipped into the receptacles at a series of positions.

4. In a machine of the class described, the combination with means for exposing sections of a strip of sensitized material, of carriers each having clips adapted to hold the edge of a sheet, a magazine for said carriers, means for cutting from the strip sheets of the sentized material, means for conveying the edges of said sheets into proximity to the magazine, and means for feeding the carriers out of the magazine and engaging the clips with the edges of the sheets.

5. In a machine of the class described, the combination with means for exposing sections of a strip of sensitized material, of carriers each having clips adapted to hold the edge of a sheet, a magazine for holding said carriers, means for cutting from the strip sheets of sensitized material, and means for removing the carriers from the magazine and engaging the clips with the edges of the sheets.

6. In a machine of the class described, carriers each comprising a frame, clips slidably mounted on the frame, each clip having jaws spring-pressed toward each other, hooks for holding the jaws of the clips open, means tending to move the clips away from each other, and releasable means for retaining the clips at fixed positions relative to the frame.

7. In a machine of the class described, a casing having therein a chamber for containing light-sensitized material, carriers, means for engaging the carriers with sheets of the sensitized material, fluid receptacles, means for conveying the carriers so as to dip the sheets into said receptacles, one of the receptacles extending partly outside of the casing, and means for moving a carrier from the inside to the outside of the casing while the sheet held thereby is immersed in said receptacle.

8. In a machine of the class described, the combination with carriers adapted to grip the edges of sheets, means for storing and exposing sheets of sensitized material, and means for engaging the carriers with the sheets, of a series of fluid tanks, and conveying devices arranged adjacent to the tanks, said conveying devices moving in vertical planes and being adapted to intermittently lift the carriers away from the tanks, move the same horizontally and then deposit them so that the sheets held thereby will be immersed in different portions of the tanks.

9. In a machine of the class described, the combination with a casing having means for storing and exposing sensitized material, of a series of independent carriers, a magazine for the carriers, means for bringing together and connecting the carriers, and sheets of the sensitized material, fluid receptacles, and means for conveying the carriers so as to successively dip the sheets held thereby into the fluid receptacles.

10. In a machine of the class described, the combination with a casing, of a series of independent carriers, a magazine for said carriers, a follower arranged to eject the carriers from the magazine, means enabling the magazine to be withdrawn from the casing, and means for preventing movement of the follower while the magazine is withdrawn from the casing.

11. In a machine of the class described, the combination with a series of carriers, of a magazine for said carriers, a follower arranged to eject the carriers from the magazine, a series of counterweights arranged to actuate said follower, and supports arranged to successively receive the counterweights as the carriers are ejected from the magazine, so that the amount of counterweight is kept approximately proportional to the weight of the carriers in the magazine.

12. In a machine of the class described, feed rolls, clamp-bars, a knife-bar, carriers, a carrier feed slide, means for actuating the feed rolls to cause them to project a strip of material between the clamp-bars, and means for actuating in sequence the clamp-bars to engage them with the strip projected between them, the knife-bar to sever the strip between the clamp-bars and feed rolls, the clamp-bars to move the severed sheet into proximity to a carrier, the feed slide to engage the carrier with the sheet held by the clamp-bars, the clamp-bars to release them from the sheet, and the feed slide to propel the carrier past the clamp-bars.

13. In a machine of the class described, independent carriers each having means for holding the edge of a sheet of pliable material, fluid receptacles, means for supporting the carriers so that the sheets held thereby will be suspended in the fluid receptacles, and automatic conveying means arranged to simultaneously lift all the carriers so as to withdraw the sheets from the receptacles, to move them horizontally, and to deposit them upon the supports at positions other than those from which they were lifted.

14. In a machine of the class described, independent carriers each having clips adapted to hold the edge of a sheet of pliable material, fluid receptacles, means for supporting the carriers so that the sheets held thereby will be suspended in the fluid receptacles, conveying means arranged to simultaneously lift all the carriers from the supporting means, to move them horizontally and to deposit them upon the supports at positions other than those from which they were lifted, and automatic means for stopping movement of the conveying means and for again starting said movement after the lapse of a predetermined time.

15. In a machine of the class described, independent carriers each having clips adapted to hold the edge of a sheet of pliable material, a casing, means for storing therein a roll of sensitized material, means for exposing sections of the material from the roll, means for storing a plurality of the carriers, means for cutting off the exposed sections of the material, and means for bringing together said sections or sheets of material and the carriers and for engaging the carrier clips with the sheets.

16. In a machine of the class described, independent carriers each having a frame, clips mounted thereon and adapted to hold the edge of a sheet of pliable material, means for holding the jaws of the clips open, means for holding the clips in fixed relation to each other, said means being releasable by the closing of the jaws, means for spreading apart said clips when released from the holding means, means for bringing the edge of a sheet of material into proximity to the carrier clips, and means for actuating a carrier to bring the jaws of the clips into position to engage the sheet and to release the jaws to permit the closing thereof and the spreading apart of the clips to stretch the sheet after it is engaged by the clips.

17. In a machine of the class described, means for storing a roll of sensitized material and for exposing sections of said material, carriers having clips adapted to hold sheets of the material, clamping devices movable in vertical guideways, means for feeding portions of the material between said clamping devices, means for cutting off the strip of material between the feeding clamping devices, a magazine for the carriers, means for removing carriers from the magazine and engaging the clips thereof with the sheets held by the clamping devices, a cam shaft, and cams mounted thereon and connected with the clamping devices, cutting devices and carrier actuating devices, whereby the same will be actuated at the proper relative periods by the turning of the cam shaft.

18. In a machine of the class described, the combination with a casing, of a plurality of independent carriers, a magazine for said carriers, a follower arranged in the magazine below the carriers, counterweights connected with said follower and adapted to actuate the same to eject the carriers from the magazine, means enabling the magazine to be withdrawn from the casing, and releasable means for retaining the follower at various positions in the magazine.

19. In a machine of the class described, a plurality of independent carriers, each having a frame and a pair of clips slidably mounted on the frame near the ends thereof, means for moving the clips away from each other, means for holding the jaws of the clips open, blocks on the carrier frames arranged so that the same may rest upon each other and the carriers be stacked in a column, a magazine adapted to retain a column of the carriers, a follower arranged below the column of carriers, means for actuating the follower to eject the carriers from the top of the magazine, means for limiting the upward movement of the column of carriers, means for pushing the uppermost carrier from the magazine, and means arranged to release the jaws of the clips as the carrier is removed from the magazine.

20. In a machine of the class described, independent carriers, each having clips adapted to hold the edge of a sheet of pliable material, a casing, means for storing therein a roll of sensitized material, means for exposing sections of the material from the roll, means for storing a plurality of the carriers, means for cutting off the exposed sections of the material, means for bringing together said sections or sheets of material and the carriers and for engaging the carrier clips with the sheets, and means on each of the carriers for placing in tension the engaged edge of the sheet of material held thereby.

21. In a machine of the class described, a plurality of separate carriers each having means for holding one edge of a sheet of material, a series of fluid receptacles, and conveying means adapted to engage the carriers intermittently and move the same to successive positions at which sheets held thereby will hang within the receptacles.

22. In a machine of the class described, a plurality of separate carriers each having means for gripping one edge of a sheet of pliable material, a series of fluid receptacles, and conveying means adapted to engage a plurality of the carriers intermittently and move them successively to positions such as to dip the sheets gripped by the carriers into the several receptacles without immersion of the carriers.

In testimony whereof I have hereunto subscribed my name in the presence of two witnesses.

FRANK E. OILER.

Witnesses:
D. O. BARNELL,
H. J. CATHSOE.